US007512529B2

(12) United States Patent
Neave

(10) Patent No.: US 7,512,529 B2
(45) Date of Patent: Mar. 31, 2009

(54) ANALYSIS AND CHARACTERIZATION OF FAULT NETWORKS

(75) Inventor: John W. Neave, Fremont, CA (US)

(73) Assignee: Roxar Software Solutions A/S, Stavanger (NO)

( * ) Notice: Subject to any disclaimer, the term of this patent is extended or adjusted under 35 U.S.C. 154(b) by 285 days.

(21) Appl. No.: 11/258,794

(22) Filed: Oct. 26, 2005

(65) Prior Publication Data

US 2007/0168169 A1   Jul. 19, 2007

(51) Int. Cl.
*G06G 7/48* (2006.01)
*G06F 17/10* (2006.01)
(52) U.S. Cl. .................. 703/10; 703/2; 702/11
(58) Field of Classification Search .......... 703/2, 703/10; 702/11, 14; 367/53
See application file for complete search history.

(56) References Cited

U.S. PATENT DOCUMENTS

| 5,982,707 | A | * | 11/1999 | Abbott | 367/53 |
| 6,128,577 | A | | 10/2000 | Assa et al. | |
| 6,191,787 | B1 | | 2/2001 | Lu et al. | |
| 6,370,491 | B1 | | 4/2002 | Malthe-Sorenssen et al. | |
| 6,502,038 | B1 | * | 12/2002 | Lazaratos et al. | 702/14 |

OTHER PUBLICATIONS

Karen S. Hoffman and John W. Neave, "Remodeling the Reservoir", Reservoir Technology, Global Outlook 2000 and Beyond, Global Exploration & Production News, Jan. 2000, reprinted by Dynamic Graphics, Inc., pp. 1-4.
Kai Xu and Xiaofang Zhou, "Multiresolution Query Optimization in an Online Environment", Proceeding of APWeb 2005 (LNCS 3399), pp. 730-741, Mar. 29-Apr. 1, 2005, Shanghai, China.
Karen S. Hoffman, John W. Neave and Robert T. Klein, "Structural Model to Reservoir Grid—An Improved Workflow", Society of Petroleum Engineers 2003 Annual Technical Conference, Oct. 2003, pp. 1-12.

* cited by examiner

*Primary Examiner*—Russell Frejd
(74) *Attorney, Agent, or Firm*—Joseph E. Root

(57) ABSTRACT

A method for modeling a geological domain in a computer system, in which the computer system includes data processing and data storage modules, one or more user input devices and a display device, in which the system first receives data relating to faults within the domain. Then there is created a surface plot for each fault described in the data, each surface plot being extended to divide the domain in two portions, and the surface plots are combined into a fault network containing all faults described in the data and displayed on the display apparatus. The network display is modified in response to user input, including the first step of rotating the display about its horizontal and vertical axes as desired to inspect the same. Then the system receives manual truncation commands and truncates indicated fault portions responsive to the same. Responsive to a command initiating automatic truncation, the system selects portions of fault surfaces for truncation according to preselected criteria and truncates the same. Finally, the system stores network information, including a record of changes made, for future use.

15 Claims, 11 Drawing Sheets

ANALYSIS AND CHARACTERIZATION OF FAULT NETWORKS

BACKGROUND OF THE INVENTION

The application relates to geologic modeling, and in particular to the interactive creation of a computerized model of a geologic domain cut by multiple fault surfaces and geologic horizons.

Accurate modeling of a subsurface domain, such as a reservoir under investigation for possible petroleum content, or in more general terms a geologic basin, is critical to the ongoing investigation of that domain. Drilling exploratory wells is an expensive undertaking, as is a full-scale seismic or magnet survey, and accurate decision-making requires accurate geological mapping.

Information about the geologic horizons present in a reservoir is clearly an important first step. Knowledge of the type and thickness of sedimentary strata gives a geologist key information in visualizing the subsurface structure. In most areas, however, strata are cut with numerous faults, making the analytical task considerably more complicated. Geologic mapping requires that the faults be identified and that the amount of the slippage along the fault plane be quantified. The amount of slippage, or "throw", can range from little to no actual movement nn the case have a fracture, to a distance of hundreds of kilometers along a major fault zone such as the San Andreas fault of California.

A 3-D model of a geologic domain would be a highly useful tool for geologists and exploration planning managers. That technology lies at the intersection between geology, geophysics, and 3-D computer graphics, and several inherent problems need to be overcome in such a product. First, data is often incomplete. The volumes in question range from the earth's surface down many thousands of feet, and data is generally difficult to obtain. Moreover, the data that is available, often in the nature of seismic survey results and well log data, is subject to considerable processing and interpretation. Second, a large measure of professional judgment goes into the rendering of any such analysis, so that the goal of any analytical tool cannot be a complete result, but rather should be aimed at assisting the geologist of to bring her judgment to bear in the most of efficient and effective manner possible.

A further difficulty stems from the inherent complexity of the problem. A typical petroleum reservoir, for example, will include a minimum of 20-50 fault surfaces up to a maximum of several hundred. A user could manually deal with a small number of fault surfaces, but this level of complexity is literally overwhelming. And not only is the task made more difficult by the sheer number of data points, but the data themselves are also highly complex. Fault structures can assume a number of shapes and configurations that are extremely difficult to depict and visualize.

The prior art offers several products, all of which fall short of an effective solution. For example, a computer program marketed under the name "Petrel", provided by Schlumberger Limited, offers the capability of producing smoothed fault surfaces, but the system has difficulty dealing with complex fault structures. Another product, called Go-CAD, produced by Earth Decision Sciences, is similarly challenged by complex surfaces. Both of these products offer 3-D visualization tools, but those do not offer the user sufficient flexibility to produce a model that is ready for a geologist's interpretation.

Finally, Dynamic Graphics, Inc, of Alameda, Calif., offers a product called EarthVision, which is aimed at this problem. That program works with a fault network, constructed on a binary tree, but that data structure is not presented in a way that users can adopt with high productivity, and it has difficulty dealing with vertical or near-vertical faults.

Thus, no product has emerged combining ease of use and the ability to deal with masses of complex data, coupled with the ability to produce a result ready for interpretation by a geologist. Those tasks remain unsolved in the prior art.

SUMMARY OF THE INVENTION

Particular aspects of the present invention are described in the claims, specification and drawings.

One aspect of the invention is a method for modeling a geological domain in a computer system, in which the computer system includes data processing and data storage modules, one or more user input devices and a display device, in which the system first receives data relating to faults within the domain. Then there is created a surface plot for each fault described in the data, each surface plot being extended to divide the domain in two portions, and the surface plots are combined into a fault network containing all faults described in the data and displayed on the display apparatus. The network display is modified in response to user input, including the first step of rotating the display about its horizontal and vertical axes as desired to inspect the same. Then the system receives manual truncation commands and truncates indicated fault portions responsive to the same. Responsive to a command initiating automatic truncation, the system selects portions of fault surfaces for truncation according to preselected criteria and truncates the same. Finally, the system stores network information, including a record of changes made, for future use.

In one embodiment, a computer-assisted method for modeling a geologic domain begins by creating a surface plot for each fault in the domain, each surface plot being extended to bisect the domain and including active areas and extended areas. Next, the system truncates selected ones of the surface plots by removing selected portions of the same from the model, leaving defined fault plots in the model. Then a binary tree data structure is built, based on the topological relation between defined fault plots. The system identifies volumetric geologic structures defined at each leaf nodes of the binary tree. The next step consists of traversing the binary tree, and at each data node analyzing pairs of the geologic structures on separate branches to determine whether the structures are separated by a defined fault plot, entering any pair of structures not separated by a defined fault plot in a fused block list.

Another aspect of the invention is a data structure for representing a fault network within a geologic domain, including a binary tree. In the binary tree, each data node represents a fault within the domain, including properties associated therewith; branches of the tree are based upon topological relationships between adjacent nodes; and leaf nodes represent volumetric entities bounded by faults within the domain. Associated with the tree is a fused block table, listing pairs of volumetric entities not separated by physical faults within the domain.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

The process of the present invention operates on a computer system that provides a central processing unit, data storage, human interface devices (keyboard, mouse, etc.) and display unit. Any reasonably powerful desktop system will suffice to operate the system, with typical minimum characteristics being 20 GB of disk storage, 1 GB RAM and a 1 GHz processor.

The system described below is an interactive process in which the computer performs calculations and organizes data displays, and the human user provides both simple operational choices as well as sophisticated professional judgments. There are no operating system or computer language constraints. One embodiment of the system was written in C++, designed to operate on Linux, Unix or Windows XP operating systems. Those in the art will understand how to adapt the system to various environments.

Figure 1:
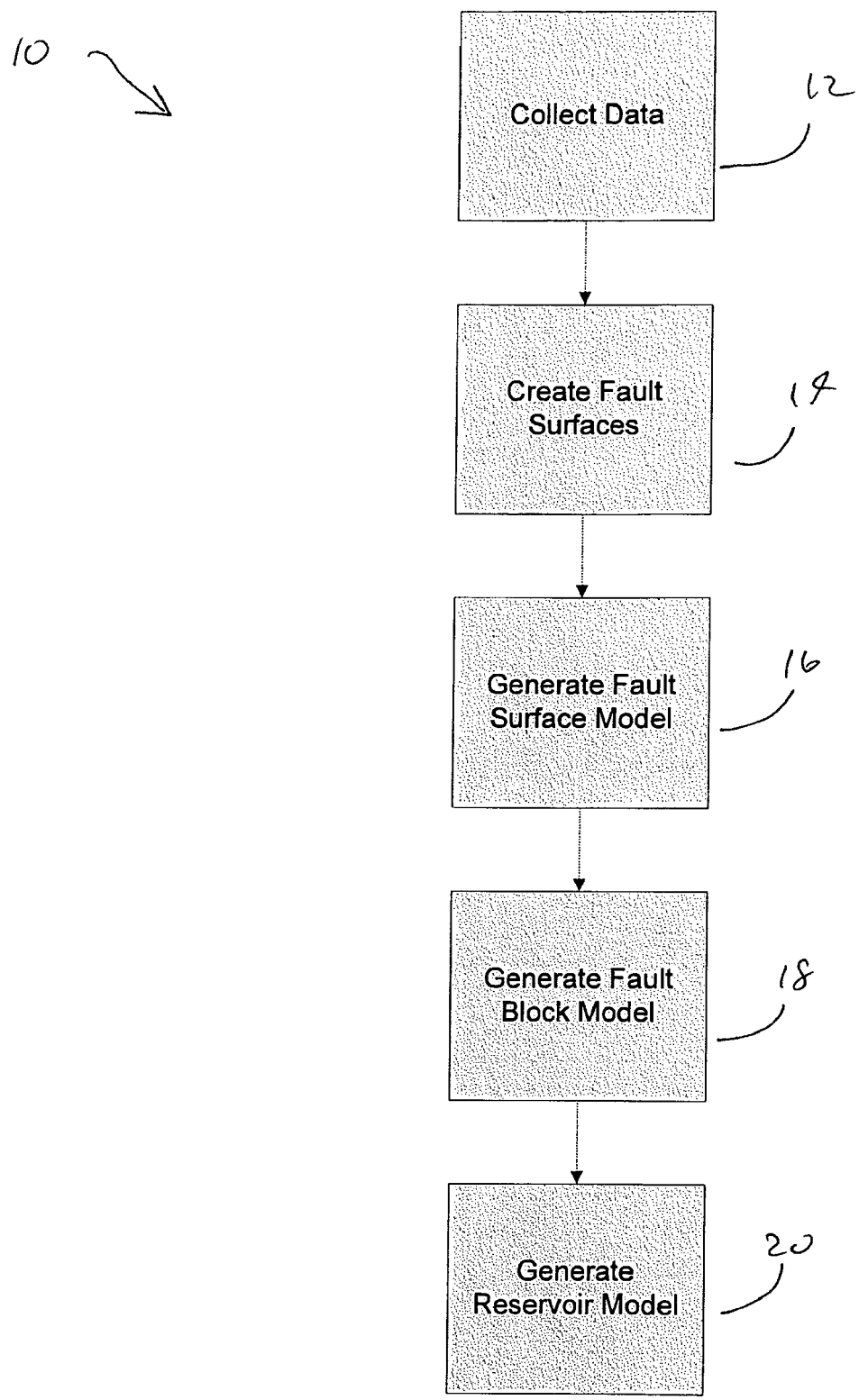
FIG. 1 is a flowchart of the embodied process of the present invention.

FIG. 1 depicts an embodiment of the process 10 of the present invention. In general, the process begins with data collecting at step 12, after which of all the surfaces are created at step 14. Once the fault surfaces are created, a fault surface model is generated at step 16, and then a fault block model is created at step 18. Each of these steps involves a number of sub-steps, as are explained in the sections below.

Data collection, in step 12, involves gathering data from a number of sources. Typically, data will be available from seismic surveys from existing mapping, or from well logging. Those in the art will understand the nature and limitations inherent in each of these data sources, as well as the techniques employed to employ such data to assemble a composite map. Data can be input in any of the many conventional methods.

Figure 2:
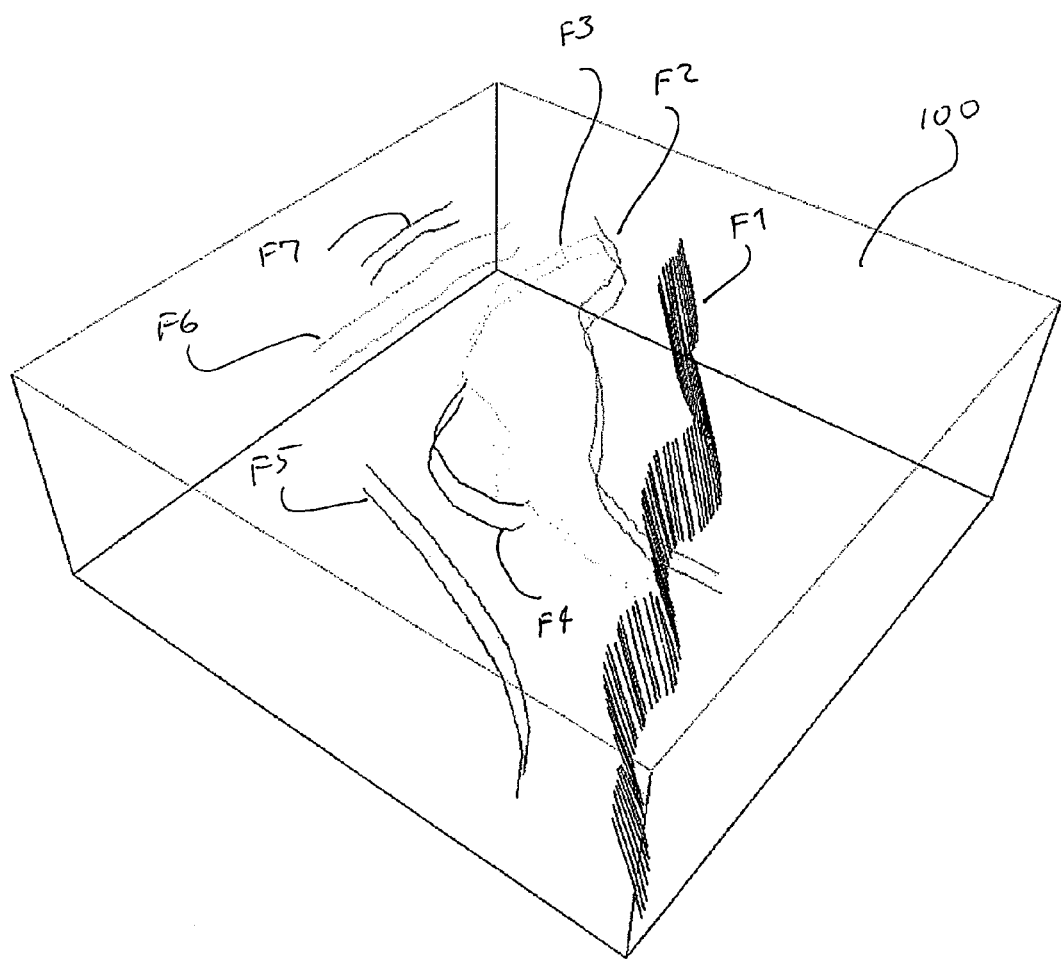
FIG. 2 depicts initial data plots according to an aspect of the present invention.

A first step is to process the available data and assemble an initial plot. FIG. 2 shows a geologic volume 100 with seven faults, F1-F7 plotted. Fault F1 is plotted from "depth fault sticks" derived from seismic survey data. As can be seen, such data provide a complete and detailed depiction of the fault surface. Remaining faults F2-F7 are plotted from depth midlines, which are derived from existing maps. Data are often incomplete, however, requiring judgment in the extrapolation from known data points to complete fault surfaces. The depth midlines of faults F6 and F7, for example, provide known data points that are limited in both the vertical and horizontal extent of the fault. As will be seen below, the present invention allows geologists to deal with such problems.

Having sets of data, the system progresses to step 14 (FIG. 1), generation of fault surfaces. Typical practice in the art would call for projecting the fault to derive a function describing the surface in three dimensions, referenced to the plane of the earth's surface. This problem involves the field of 3-D graphics, which offers a number of solutions to such problems. To be useful in the environment of fault mapping, a solution must offer a combination of rapid calculation, easy visualization and straightforward modification. Other criteria include the size of the resulting data structure, the ease of associating properties with the data, the ability to identify precisely the relationship between a given point and fault surfaces, and the ability method to honor fault data.

It should be noted that the present system generates 3-D views of the geologic domain and fault surfaces. As can easily be seen in later drawings, fault relationships can be highly complex, and only by visualizing them in three dimensions can one gain a full understanding of individual faults and the relationships with a fault network. The graphics capability of both the computer language and operating system chosen for implementation, as well as that of the platform on which the system is run, must support powerful graphics capabilities. At a minimum, such a system must have sufficient computing and graphics power to calculate and manipulate surfaces rapidly. The ability to rotate a display on three axes is also important for adequate analysis of faults.

Figure 3A:
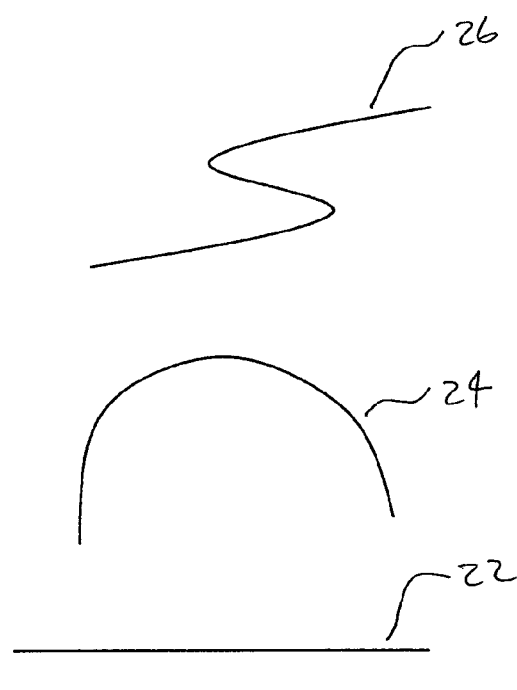
FIG. 3 illustrates a gridding technique employed in the present invention.

Historically, faults have been represented on maps using various projection techniques, such as drawing lines and polygons onto known horizons. That method presents a number of problems, however, and a much preferable technique is found in development of a vertical scalar field, in which a function is defined for $z=f(x, y)$. As seen in FIG. 3a, projecting onto a vertical scalar field in a cardinal direction A presents a wholly trivial task for simple planar fault 22, and only slightly more complicated for more curved surfaces such as fault 24, producing in both cases a set of z values as a function of x and y. It can be seen, however, that the problem becomes more complicated toward the ends of fault 26, as the curvature approaches the vertical. Folded fault 26, however, is simply not amenable to conventional techniques, as multiple points in the z direction correspond to single values on the x axis.

Figure 3B:
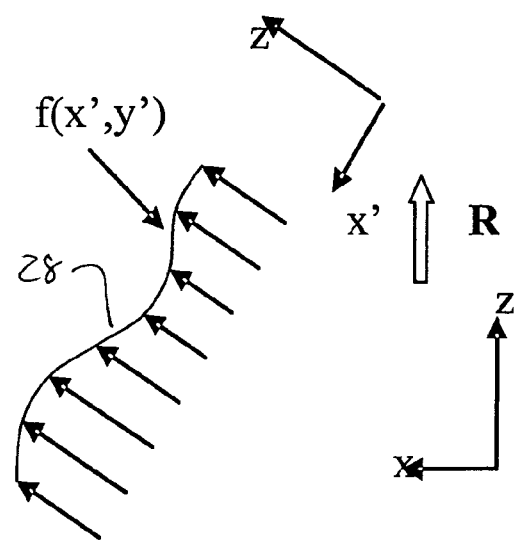

A solution is seen in FIG. 3b, where the issue of folding is addressed by rotating the frame of reference used in producing the grid. Here the conventional frame of reference is rotated to allow projection of fault 28, so that values in the z direction can be represented as a function of x' and y'. It has been found that employing rotated gridding offers the best solution to the difficulties associated with mapping complex fault networks.

The resulting data structure is a collection of individual points. A number of techniques are known in the graphics art for working with such data sets, and it has been found most advantageous to employ b-spline multi-resolution smoothing to develop a smooth, continuous surface plot.

Polygonal meshes are widely employed in 3-D graphics, but their utility in the fault network environment is limited by the difficulty of working with such surfaces for data enquiries, such as associating properties with data points, or the important question of whether a given point lies on one side or the other of a fault surface. It was thus decided not to rely on polygonal meshes as a primary surface generation technique. On the other hand, polygonal mesh techniques allow the effective and rapid visualization of surfaces, and to that end, the smoothing step is followed by the insertion of a polygon mesh onto the surface as a visualization and graphics tool, employing known techniques.

Figure 4:
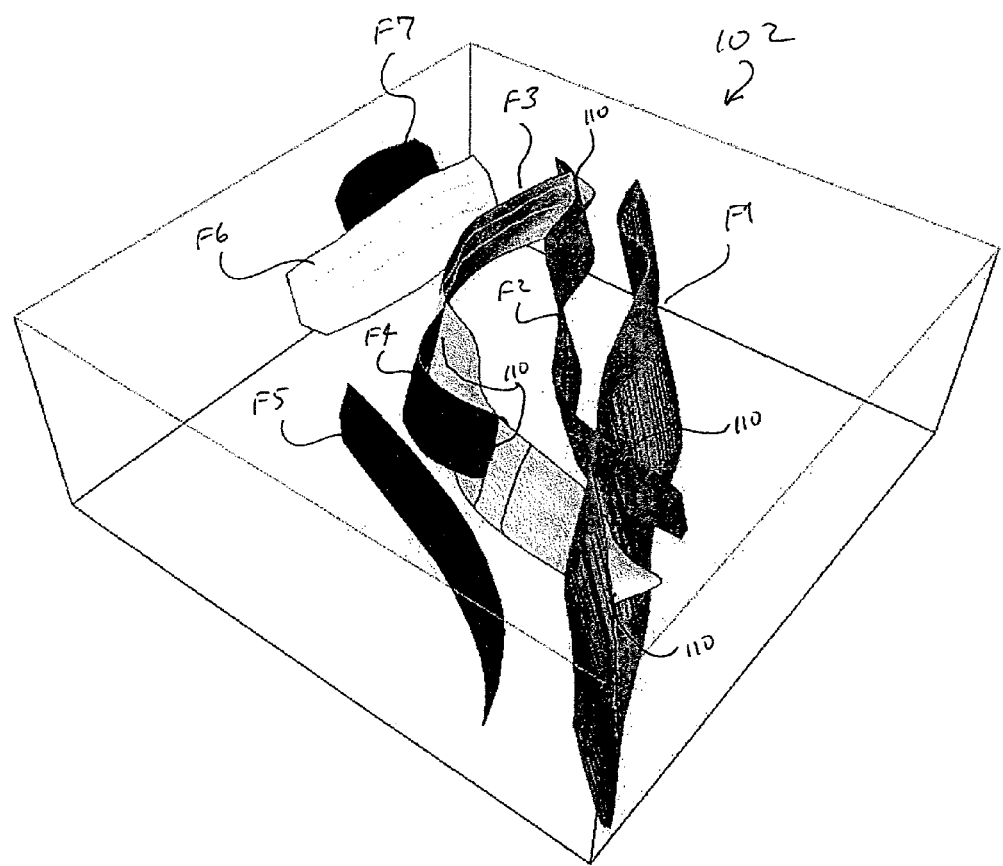
FIG. 4 depicts a fault network model according to an aspect of the invention.

The process described above for a single fault data set is reiterated for each identified fault, producing in the example here, a fault surface network 102, shown in FIG. 4. The seven fault data sets represented in FIG. 2 have been converted here to fault surfaces F1-F7 in three dimensions. At this point, the surface representations are not subjected to adjustments based on judgments about the likely geological reality, but rather the objective is a comprehensive set of surface representations that reflect all available data.

Other embodiments could employ other mathematical techniques, so long as such approaches produce a result that meets the criteria of accuracy, power and ease of use. A parametric surface representation, for example, or a vector-oriented approach could be substituted for the rotated grid structure described above.

The application of systematized judgment to the fault surface network occurs in step 16 (FIG. 1), where the fault surfaces are processed to produce a fault surface model, which represents the most likely depiction of geologic reality for the geologic domain under study.

Figure 5:
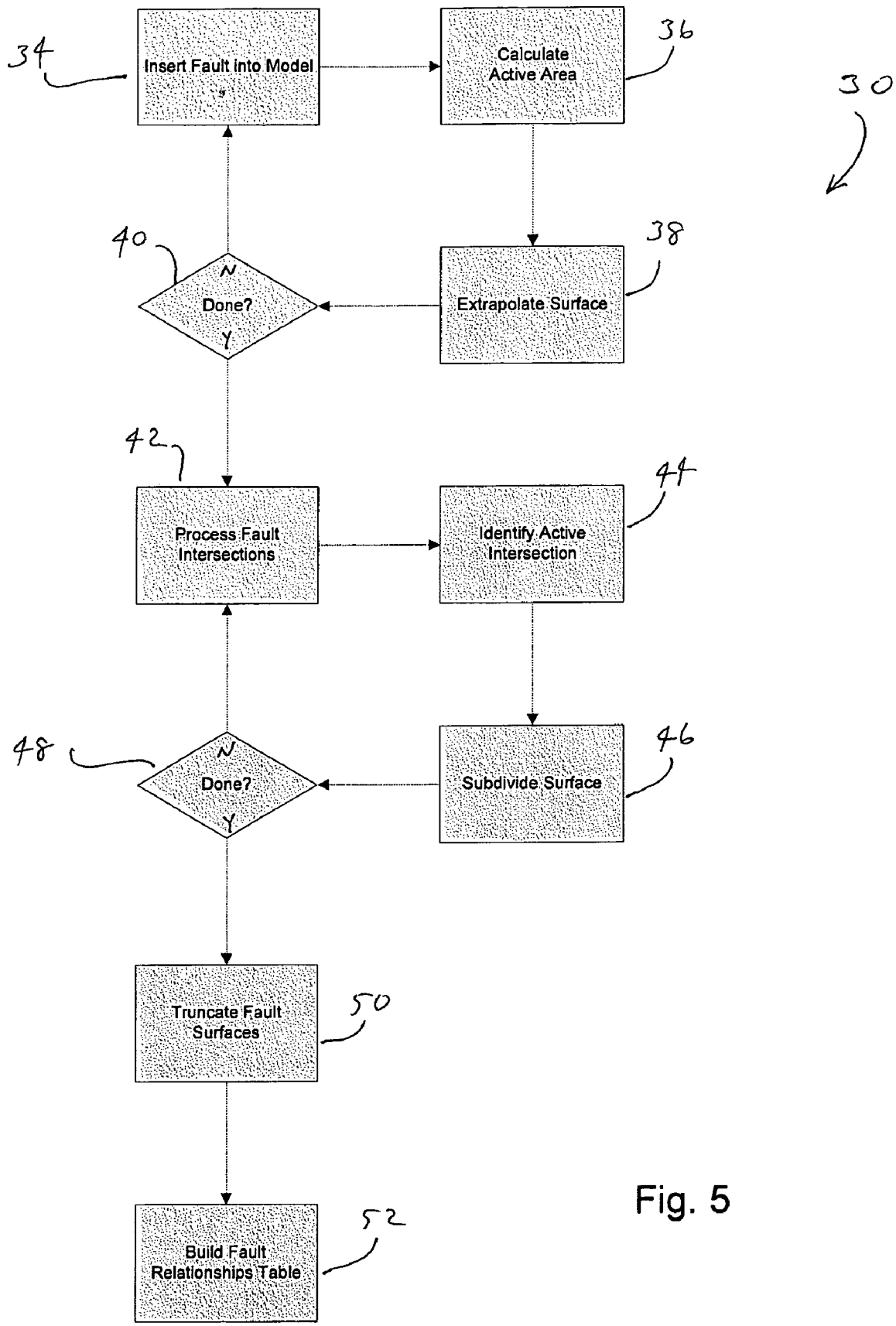
FIG. 5 is a flowchart illustrating a method of building the fault surface model of an aspect of the invention.
Figure 7:
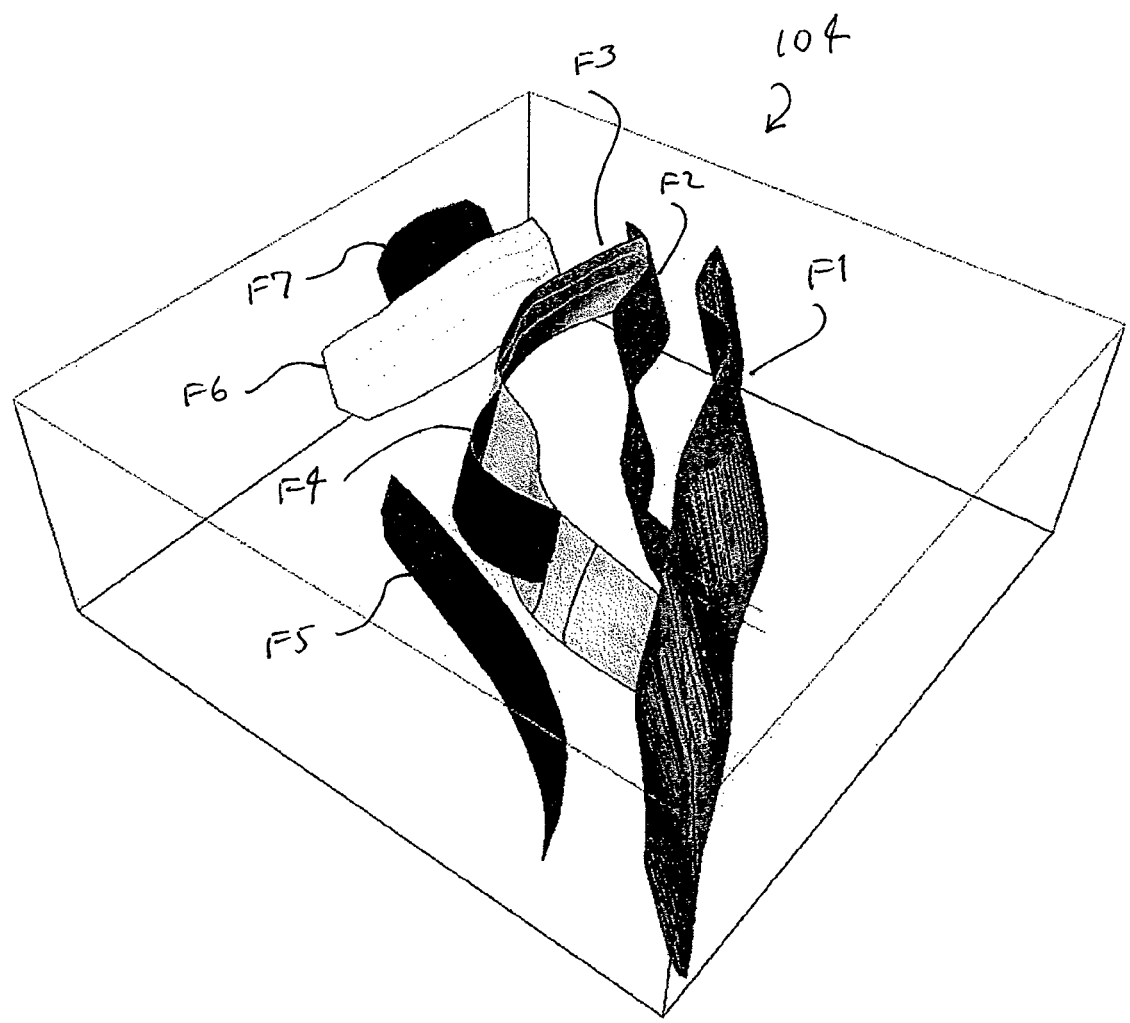
FIG. 7 illustrates the fault surface model after truncation according to an aspect of the invention.

The sub-process 30 for generating the fault surface model is shown in FIG. 5. In general, this process can be described as first processing the individual faults (steps 34-40); then processing fault intersections (steps 42-48); followed by fault truncation (step 50) and building a fault relationships table (step 52). Each of these actions is discussed in detail below. The completed fault surface model 104 is shown in FIG. 7.

Each fault surface is inserted into the fault surface model by analyzing and characterizing fault surface properties. For purposes of visualization, the fault surface network 102 of FIG. 4 can be thought of as an "in process" depiction of the fault surface model, as explained below.

Each fault is analyzed by estimating the active area of the fault (step 36, FIG. 5), and then extending the fault surface in all linearly and laterally to bisect the geologic domain (step 38, FIG. 5). The active area of the fault surface is that portion of the surface that corresponds (or more accurately, is believed to correspond) to an actual faulted surface in the domain—a surface formed by at least a fracture, and more usually movement along the fault plane, in the rock mass. A number of techniques for estimating active area are known in the art. In one embodiment of the invention, a convex hull calculation is performed, as follows. Input data is first converted to a 2D field, ignoring the z dimension, and calculations are based on the input data as extended by user-defined extensions in the strike and dip directions of the fault surface. One embodiment of the invention employs the Jarvis march algorithm to accomplish this result, while another utilizes the Graham scan. The former is simple and easy to implement, the latter slightly more efficient at run time. Either can be selected, or another from those described in the literature. All produce an output consisting of a polygon, which in the present application represents the fault active area. It is desirable to smooth the edges of the active area, which can be done using a number of known algorithms.

Once the active area of the fault is defined, the fault surface is extended so that the extended surface bisects the geologic domain. This can be seen clearly in FIG. 6, where the fault surface model is projected on a 2D surface for purposes of visualization. There, fault F4 includes an active area 104 and two extensions 106 and 108. This bisection process is a key step in the binary space partitioning process, discussed in detail below. It should be noted that faults such as fault F4 can be extended by simply carrying the surface in exactly the same direction as the final segments of the active area, or, as in other embodiments, an algorithm can be applied that extrapolates the fault generally parallel to the overall strike of the fault. It is generally preferred to emphasize calculation speed and storage requirements in selecting the method for calculating the position of the extrapolated area.

Figure 6:
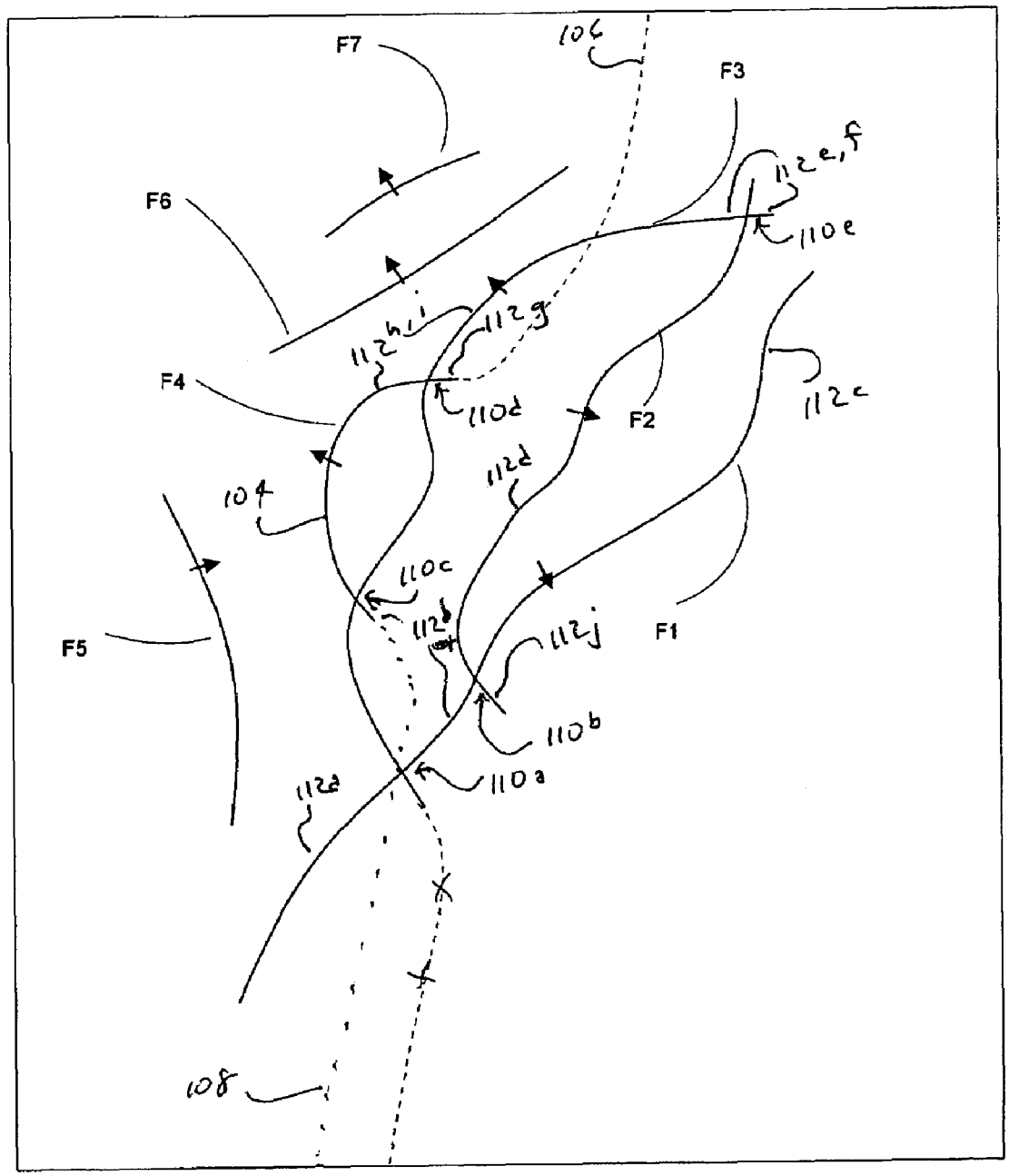
FIG. 6 is a 2D depiction of the fault model of an aspect of the invention.

The last piece of data needed to characterize a fault surface is the direction of "up". The need for that data will be obvious from the discussion below, and it is generally preferred simply to calculate the direction of a vector orthogonal to the fault surface, located at the center of the active area, as the idea of "up" and "down" in this context has mathematical, not purely physical, meaning. The arrows shown for each fault in FIG. 6 illustrate the results of this action.

After fully characterizing the individual faults, the relationships between faults are analyzed, in steps 42-48 (FIG. 5). These steps, and those that follow immediately afterward, can be generally described as "fault truncation", or the deletion from the model of surface areas that most likely are not real faults in the rock mass. This process is necessary because the underlying fault data inevitably contains errors, as illustrated in FIG. 4. There it can easily be seen that a number of plotted faults intersect, with active portions of both faults extending past each other in X-patterns. In fact, such formations are vanishingly rare on the ground. In instances where a young fault cuts across an existing, older fault, movement along the younger (or the more active, whatever the age relationship) fault quickly disrupts the X-pattern, producing in its stead two T's, offset by the throw distance along the fault. Therefore, when one observes crossing patterns such as those seen in FIG. 4, it is safe to assume that the data are wrong and that some corrective action should be taken. The following steps assemble the data required for deciding what form such action should take.

First, each active intersection is identified and classified (step 44). Intersections are simply lines where two faults share the same set of points, so these can be quickly found and labeled using well-known techniques. In the example of FIGS. 4 and 5, intersections 110a-e between faults F1 and F2, F2 and F3, and F4 and F3 meet that criterion. Three types of intersections are possible, involving (1) two active areas, (2) two extrapolated areas, or (3) one active and one extrapolated area. Of those, only intersections involving two actives areas are investigated here. That limitation flows from the purpose of the extrapolated areas in defining relationships among fault surfaces, as explained more fully below, and the process of fault truncation, which seeks to identify the true picture of faults in the rock mass.

The points of intersection define lines, which subdivide each fault, and the resulting areas are identified as "truncatable areas", which simply means areas bounded either by a fault end line and an intersection or two intersections. These are areas that can be cut out of the model as desired. A number of faults have no intersections, and thus no truncatable areas, such as faults F5, F6 and F7. Others have a number of truncatable areas 112a-l; fault F3, for example has five such areas.

The truncation process—the elimination of fault segments that most likely do not exist in the rock mass—can proceed either manually or automatically. The former takes advantage of the ability to exercise professional judgment in selecting which fault segments to delete. In complex situations, many situations arise in which no blind application of rules exists that can completely supplant the judgment of an experience geologist. On the other hand, in a geologic domain that includes hundreds of fault surfaces, not the seven treat in the example here, many truncation decisions can be made based on the algorithm presented below. Leaving those decisions to a geologist would be a misuse of those resources.

A preferred solution is to divide the task between manual and automatic modes. One preferred process would have a geologist begin by identifying those decisions requiring professional judgment and making those decisions. The remainder can be made in automatic mode. Such an approach uses the two available skills—experienced judgment and computational power—to best advantage.

The manual mode proceeds by displaying the completed fault surface model of FIG. 4, following the calculations through step 48 (FIG. 5). In one embodiment, the user can employ a mouse to select truncatable areas for truncation, with appropriate keystroke or other command means for executing the truncations. It is important to reiterate that the graphics display must permit rotation about three axes, complete zooming and similar capabilities to allow the geologist to apply knowledge quickly and move on.

In automatic mode, the system takes advantage of the fact that the larger portions of active areas are those more likely to be actually present. Thus, for example, in looking at fault F4, even one of minimal training can surmise that the portions of F4 lying above fault F3 are more likely to be correctly shown than the two areas lying below F3. Thus, the automatic truncation algorithm examines each identified intersection, determines the possible truncations at that intersection, and selects that truncation producing the smallest amount of surface area.

For example, consider intersection 110b, best seen in FIG. 6. Four truncatable areas extend from that intersection, 112b, 112c, 112d and 112j. The system would calculate the areas of each truncatable area, but it can be seen that the result of such calculation would have area 112j as the smallest. In automatic mode, that area would be automatically truncated. Interface systems for that process are within the skill of those in the art, but one embodiment would include the ability to specify the order in which faults are selected for automatic analysis, for example. Another embodiment would offer a semi-automatic mode, in which the system would perform the calculations, select areas for truncation and seek user approval before performing the truncation.

Under either truncation regime, the system builds a rule table that reflects the changes made during truncation. Such a table is shown below, and there it can be seen that one format for truncation rules is in general form "X truncated<above><below>Y", reflecting the topological relationship between faults. The rules shown indicate, for example, that fault F1 is not truncated at all; that F2 is truncated above F1; that F3 is truncated above F1 and below F2; and the F4 is truncated above F3. The rules table has broader ramifications, as will be seen below. The system should make the rules table readily available to the user.

TABLE 1

| | | |
|---|---|---|
| F1 | | |
| F2 | Above F1 | |
| F3 | Above F1 | Above F2 |
| F4 | Below F3 | |

FIG. 7 shows the fault surface model 104 following truncation operations. It is important that the system retain a full record of every truncation made, and that a simple interface be provided for reviewing and possible undoing all truncations. Given the role that judgment plays in this process, it is crucial to be able to identify possible mistakes and to repair them with minimum effort.

The goal of the analysis, it should be remembered, is not the fault structure per se, but that to use the fault structure as a tool for better understanding the geologic domain. Therefore, the next step is to move from the fault surfaces to the fault blocks—the geologic units bounded by the fault surfaces. The key point of the present method is to use the fault surfaces, and the relationships between them, to define the volumes bounded between them. A general description of the method employed here is that of binary space partitioning trees, data structures that provide both a geometrical relationship and search structure for the geologic domain.

This process is analogous to the use of binary tree structures in developing search algorithms and in 3-D graphic applications. First, faults are classified in terms of their relations to other fault surfaces. Then a binary tree structure is assembled and optimized. Here, however, the "leaf" nodes of the tree will represent fault blocks.

The classification process starts with the assembly of a fault relationship table, which lists each fault and topologically classifies every other fault as being above that surface, below that surface or straddling that surface. That information flows from the earlier steps of extending each surface to bisect the geologic domain, as well as defining the "up" direction for each surface. For the example under discussion, the initial fault relationship table is shown in Table 1, as follows:

TABLE 2

| | Above | Below | Straddle |
|---|---|---|---|
| F1 | | F4, F5, F6, F7 | F2, F3 |
| F2 | | F4, F5, F6, F7 | F1, F3 |
| F3 | F5, F6, F7 | | F1, F2, F4 |
| F4 | F5, F6, F7 | F2 | F1, F3 |
| F5 | F2, F3, F4, F6, F7 | | F1 |
| F6 | F1, F2, F3, F4, F5 | F7 | |
| F7 | | F1, F2, F3, F4, F5, F6 | |

Table 1 reflects the situation shown in FIGS. 4 and 6, prior to truncation. Particular attention should be paid to the "straddle" category. As mentioned above, the goal of this process is a binary tree, and by definition, straddles involve situations where one surface is both above and below another. The following discussion shows how that situation is handled.

As a first step in that solution, truncation removes a number of the straddle situations. Table 2 shows fault relationships reflecting FIG. 7a, after truncation. As evident there, truncation of both F2 and F3 above F1, for example, eliminates both of those straddle situations.

TABLE 3

| | Above | Below | Straddle |
|---|---|---|---|
| F1 | | F2, F3, F4, F5, F6, F7 | |
| F2 | | F3, F4, F5, F6, F7 | F1 |
| F3 | F4, F5, F6, F7 | | F1, F2 |
| F4 | F5, F6, F7 | F2 | F1, F3 |
| F5 | F2, F3, F4, F6, F7 | | F1 |
| F6 | F1, F2, F3, F4, F5 | F7 | |
| F7 | | F1, F2, F3, F4, F5, F6 | |

The remaining straddles are dealt with in the course of building a binary tree. The basic process of building a binary tree is well known in the art and therefore will not considered in depth here, except as bears directly on the process at hand. In general that process goes forward by selecting a root node and successive branch nodes, with successive nodes placed above or below the previous node, based on the topological relationship between the respective fault surfaces. Here, selection of the root node is based on two criteria: First, that a node be selected having the minimum number straddles; and second, that among nodes passing the first criterion, the node selected should offer the best balance between numbers of "Above" and "Below" listings. It is highly preferable that the chosen node have no "straddles," but in some circumstances that situation cannot be avoided.

Choices for the root node thus become F1, F6 and F7, as those surfaces have no straddling faults. None of these offer well-balanced structures, but the best is F6, so that one is chosen as the root node. As to the immediate branches, only F7 lies above F6, so that fault occupies the "above" branch. Of the five faults lying below F6, only F1 has not straddling faults, so that fault is chosen, producing the following initial tree structure:

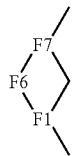

Next, the relationships table is reconstructed for each branch of the tree. Here, F7 is the only fault on the "above" branch, so no table is required there. The new table, showing the branch "F1 below F6", is as follows:

TABLE 4

|    | Above      | Below      | Straddle |
|----|------------|------------|----------|
| F2 |            | F3, F4, F5 |          |
| F3 | F4, F5     |            | F2       |
| F4 | F5         | F2         | F3       |
| F5 | F2, F3, F4 |            |          |

Both F2 and F5 lack straddles, and both of them are equally unbalanced, so selection of the next node is optional between these two. Construction of the remainder of the tree follows directly, producing the following structure:

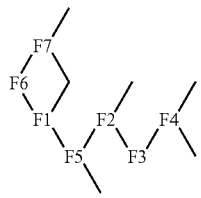

It must be emphasized that this example shows the principles involved, but it in now way reflects the scope of a project encountered in the field. Seven faults can easily be analyzed by hand, and a tree easily construction. Several hundred faults presents an entirely different problem, and the resulting tree structure is not easily constructed. Moreover, a binary tree of that size involves considerable recursive optimization, clearly a task for a computer.

Figure 8:
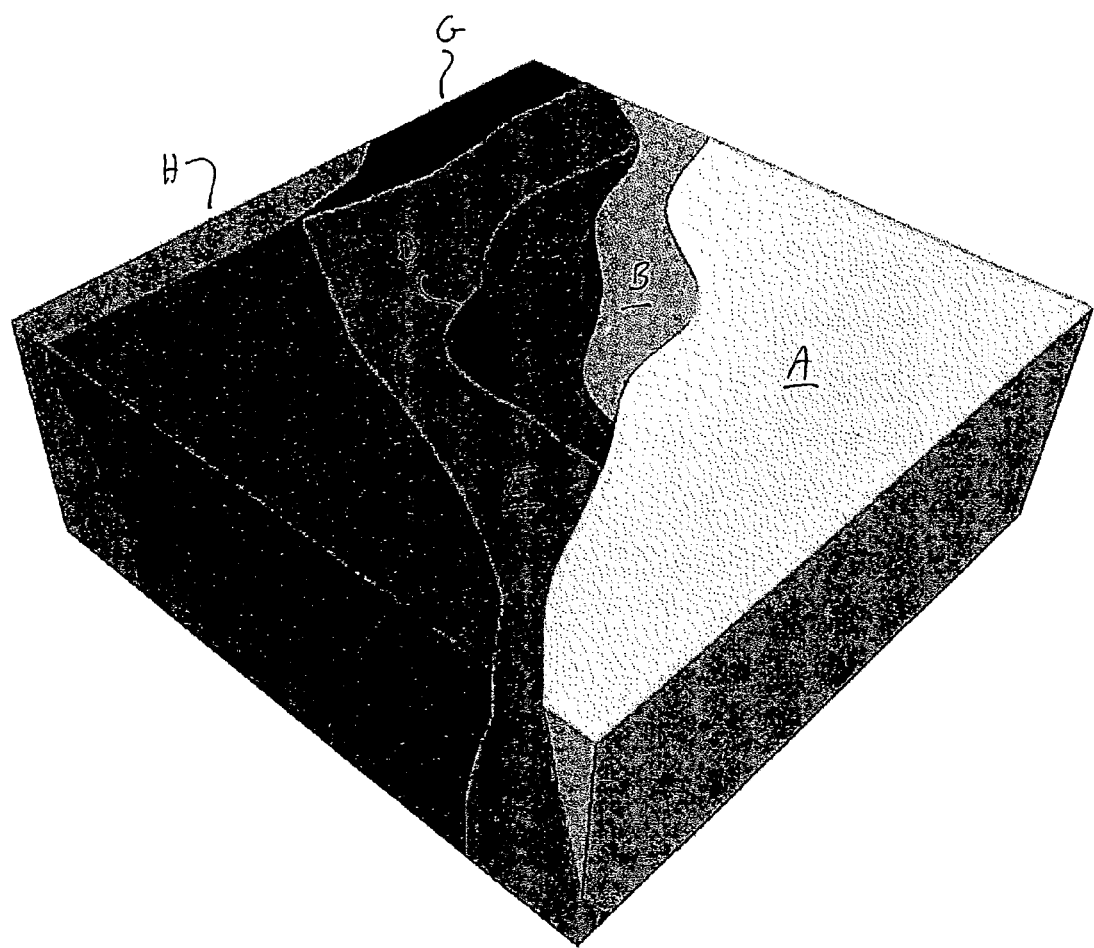
FIG. 8 illustrates the fault block model constructed according to an aspect of the invention.

The binary tree presents a fault block model, in which each leaf of the tree represents a fault block, a volume bounded by faults. The resulting fault block model 120 is shown in FIG. 8, in which the faults previously emphasized have become the boundaries between volumes in the geologic domain. Blocks A-H correspond to the following leaf nodes of the binary tree previously constructed:

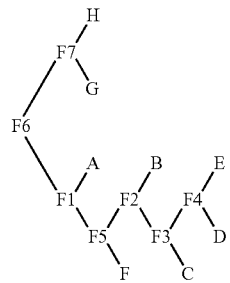

Because the analytical work involved in tasks such as reservoir or basin characterization focuses on the fault blocks, not the faults, this development offers the opportunity to organize data into a structure that is more easily accessed than previously.

As noted above, the scenario discussed above is highly simplified for ease of understanding. An important aspect of fault network analysis needs to be added in order to generate models that conform to geologic reality.

Figure 9A:
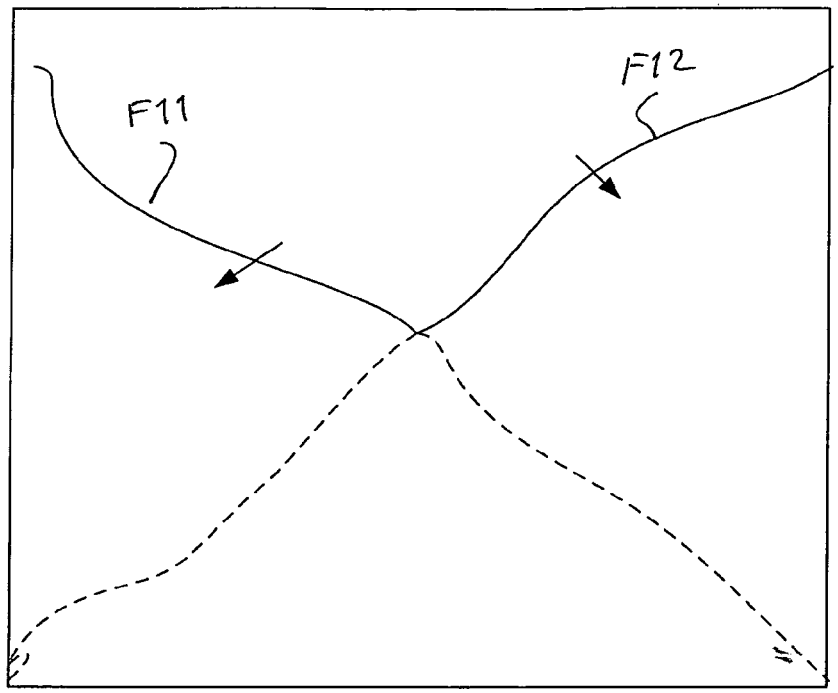
FIGS. 9a and 9b illustrate a method for dealing with an issue raised in the course of building geologic models.

This problem arises because the binary tree structure discussed so far is not capable of dealing with certain situations. The paradigm configuration is shown in FIG. 9a, where two faults F11 and F12 intersect at an angle (rather than having one fault terminate against another, as discussed above). The drawing shows the faults and their sense of direction, together with their respective extended areas (shown as dashed lines).

Based on the discussion above, it is clear that the extended sections should be truncated, which would generate the following truncation rules table:

TABLE 5

| F11 | Above F2 |
| F12 | Above F3 |

The binary tree structure for that network could assume either of the following forms:

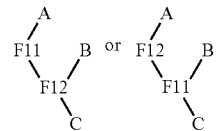

Figure 9B:
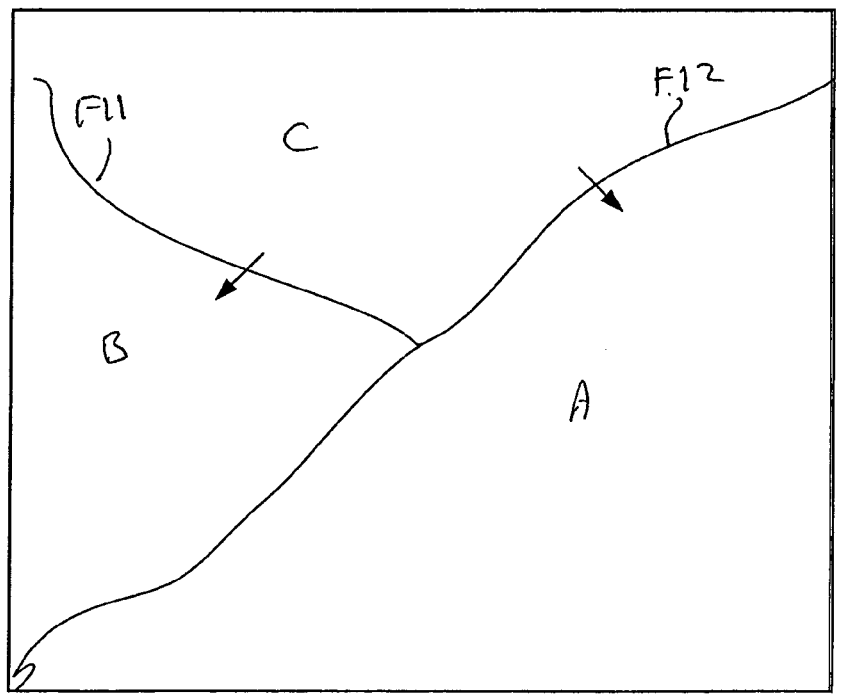

The latter tree yields the block structure shown in FIG. 9b. As can be seen, block C is clearly defined by faults F11 and F12, but blocks A and B are separated by a portion of F12 that does not exist in the geologic domain.

Whether one begins with F11 or F12, however, it is clear that the rule calling for the identification of a fault block at every leaf node will produce three fault blocks, not the two blocks that a visual inspection would suggest. In other words, the binary tree approach, by itself, can produce results that do not mirror reality.

Figure 10:
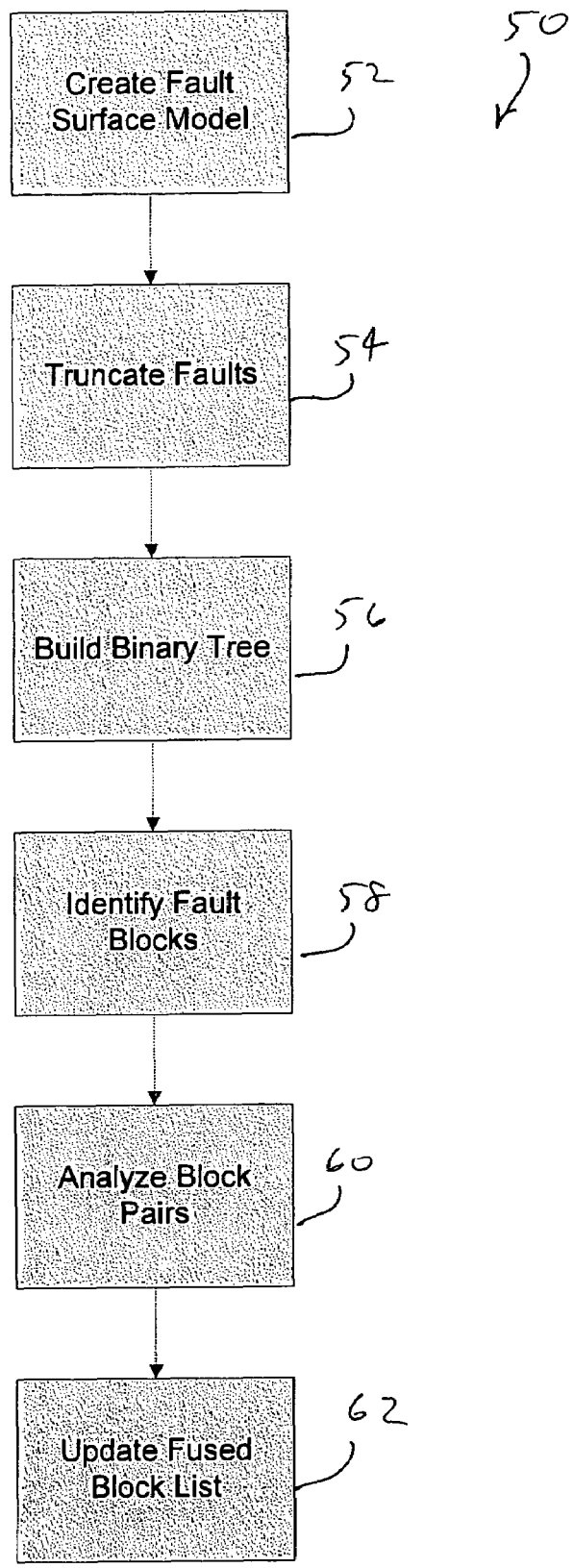
FIG. 10 is a flowchart outlining the process of proceeding from a fault surface model to a fault block model according to an aspect of the invention.

What is required is to add an analysis step to the binary tree process, as reflected in the process 50 shown in FIG. 10. At step 52 the fault surface model is created, followed by fault truncation, step 54. That step is followed by the binary tree construction, step 56. These steps are discussed in detail above, as is step 58, identifying fault blocks at the leaf nodes of the tree.

To avoid the problem of improper fault blocks, step 60 is introduced. There, the system traverses the tree, and at each data node (that is, a fault node), the pairs of fault blocks above and below that node are analyzed to ensure that each pair of blocks is in fact separated by a real fault, not a truncated fault section. For example, one can consider the branches stemming from the F1 node of the binary tree derived from FIGS. 6 and 7, above. Block A lies above that node, and blocks B, D, E, C and F lie below it. The system analyzes each pair of blocks to determine whether a real fault separates them. Here, blocks A and B are separated by F1; A and E by F1, and so on.

In the event that a combination is found where two blocks are not separated by a real fault, those blocks are entered on a fused block list, in step 62. It should be noted that as used here, the term "fused" should not be understood as implying that the blocks are in fact joined, but rather that the blocks should be treated as a single geologic unit by the system. For example, in later processing, the system may perform manipulations of the model to allow for throw along various faults; here, the amount of throw would be constrained to zero, because no physical fault exists. In analyzing the tree derived from FIG. 9, therefore, blocks A and B would be shown on the binary tree as separate, but based on the entry in the fused blocks list, the system would track the fact that they should be treated as a single physical entity.

An important result of this analysis is that when considering the data structure required to represent that fault network, the binary tree alone is not sufficient to describe the model. Rather, the binary tree and the fused block list must be treated together.

Figure 11:
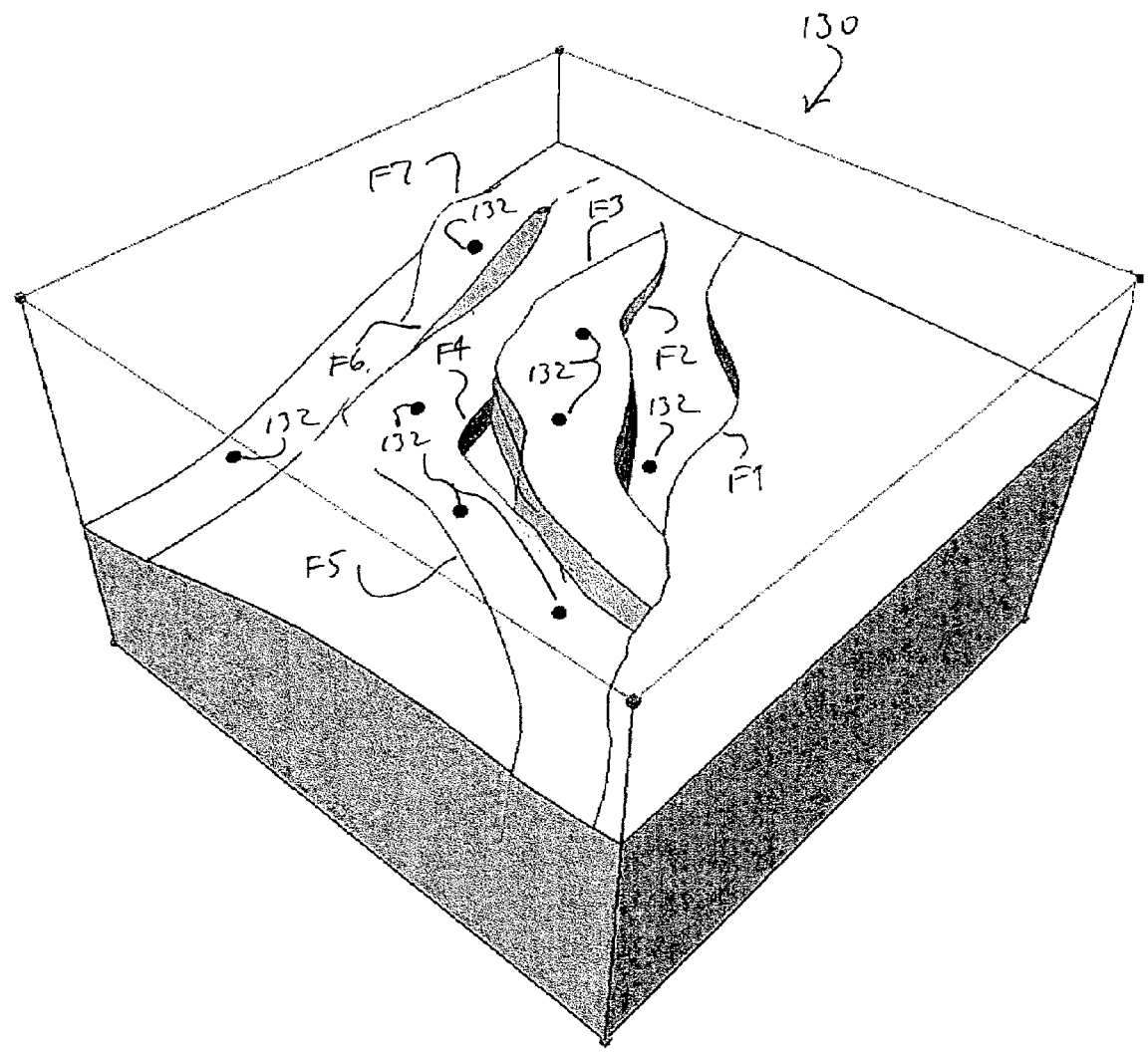
FIG. 11 illustrates a final horizon model constructed according to an aspect of the invention.

The final step in the process is integrating the fault block model into a reservoir model, reflecting not only fault information but also data concerning other horizons in the domain. Techniques for such data integration are known to those in the art and are not set out here FIG. 11 shows reservoir model 130. As can be seen, this rendering depicts faults F1-F7 in context within the reservoir. In addition to data from seismic or map sources, specific horizon data is also obtained typically from logging data from wells 132.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for analyzing fault networks, systems including logic and resources to carry out fault network and reservoir analysis, media impressed with logic to carry out reservoir, basin or fault network analysis, or computer-accessible services that carry out computer-assisted fault network and reservoir analysis. It is contemplated that modifications and combinations will readily occur to those skilled in the art, which modifications and combinations will be within the spirit of the invention and the scope of the following claims.

I claim as follows:

1. A method for modeling a geological domain in a computer system, wherein the computer system includes data processing and data storage modules, one or more user input devices and a display device, comprising the steps of
    receiving data relating to faults within the domain;
    creating a surface plot for each fault described in the data, each surface plot being extended to divide the domain in two portions;
    combining the surface plots into a fault network containing all faults described in the data, and displaying the fault network on the display apparatus;
    modifying the network display in response to user input, including the steps of
        rotating the display about its horizontal and vertical axes as desired to inspect the same;
        receiving manual truncation commands and truncating indicated fault portions responsive to the same;
        responsive to a command initiating automatic truncation, selecting portions of fault surfaces for truncation according to preselected criteria and truncating the same;
    storing network information, including a record of changes made, for future use.

2. The method of claim 1, wherein said receiving manual commands includes the steps of receiving commands from a user interface device, visually indicating the fault portion selected, and receiving a further command indicating truncation of said selected fault portion.

3. The method of claim 1, wherein said selection step in said automatic truncation step includes the steps of identifying an intersection between two faults; identifying fault segments associated with said intersection including possible truncation combinations for the same; calculating the area of said possible truncations; and selecting the truncation combination producing the smallest truncated surface area.

4. The method of claim 1, wherein said modifying step further includes the step of selecting certain surface plots for manual processing and certain other plots for automatic processing.

5. The method of claim 1, wherein said surface plots are created using rotated scalar field gridding to define said plots.

6. The method of claim 1, wherein said modifying step further includes the step of generating a rules table reflecting the results of each said truncation.

7. The method of claim 1, further including the step of integrating geologic horizon data to produce a comprehensive model of the geologic domain, including fault and horizon data.

8. A computer-assisted method for modeling a geologic domain, comprising the steps of
    creating a surface plot for each fault in the domain, each surface plot being extended to bisect the domain and including active areas and extended areas;
    truncating selected ones of said surface plots by removing selected portions of the surface plots from the model, leaving defined fault plots in the model;
    building a binary tree data structure based on topological relation between defined fault plots;
    identifying volumetric geologic structures defined at each leaf node of said binary tree;
    traversing said binary tree, and at each leaf node analyzing pairs of said geologic structures on separate branches to determine whether said structures are separated by a defined fault plot; and
    entering any said pair of structures not separated by a defined fault plot in a fused block list.

9. The method of claim 8, wherein said surface plots are created using rotated scalar field gridding to define said plots.

10. The method of claim 8, wherein said truncating step is visually indicated.

11. The method of claim 8, wherein said truncation step further includes the step of generating a rules table reflecting said truncation.

12. The method of claim 8, wherein said truncation step further includes the step of generating a rules table reflecting said truncation, and said binary tree structure is built according to said rules table.

13. The method of claim 12, further including the step of building a fault relationships table from said rules table and said fault plots, reflecting the topological relationships between each fault and all other faults in the domain.

14. The method of claim 8, wherein said creating surface plot step further includes selecting a mathematical sense of direction of up and down for each surface plot, and said binary tree building step includes selecting topologically between said up and down directions.

15. A method for modeling a geological domain in a computer system, wherein the computer system includes data processing and data storage modules, one or more user input devices and a display device, comprising the steps of receiving data relating to faults within the domain;

creating a surface plot for each fault described in the data, each surface plot being extended to divide the domain in two portions, and each surface plot having assigned mathematical up and down directions;

combining the surface plots into a fault network containing all faults described in the data, and displaying the fault network on the display apparatus;

identifying intersections between said faults, and responsive to said intersections, subdividing faults participating in said intersections into separate truncatable areas, said truncatable areas being visually identifiable in said display;

responsive to commands, truncating selected truncatable areas;

recording the results of each truncation in a rules table, based on the topological relationship between the truncated fault portion and the fault intersecting with the same;

building a fault relationships table from said rules table and said fault network, reflecting the topological relationships between each fault and all other faults in the domain;

building a binary tree data structure based on topological relation between defined fault plots;

identifying volumetric geologic structures defined at each leaf nodes of said binary tree;

traversing said binary tree, and at each leaf node analyzing pairs of said geologic structures on separate branches to determine whether said structures are separated by a defined fault plot; and entering any said pair of structures not separated by a defined fault plot in a fused block list.

* * * * *